(No Model.)
R. E. HAMMER.
BACK PEDALING BRAKE.
No. 600,783. Patented Mar. 15, 1898.
FIG. 1
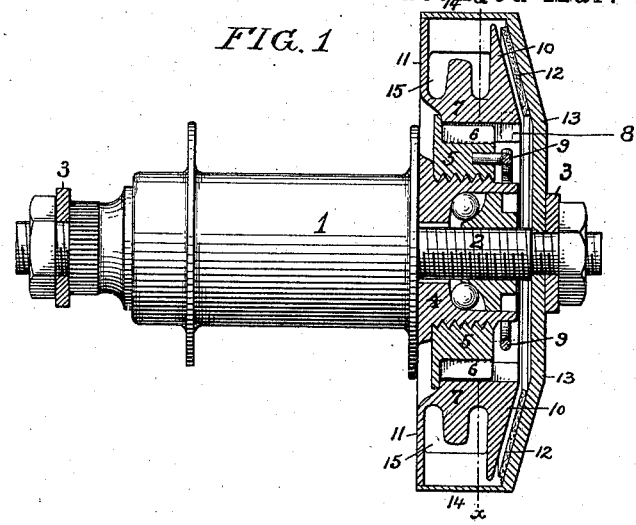
FIG. 3.
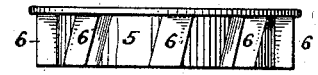
FIG. 2.
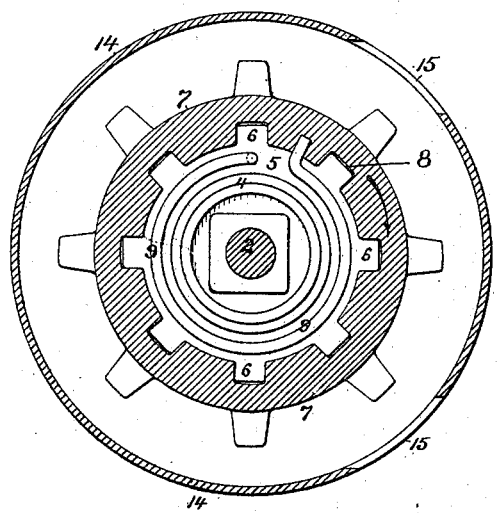
FIG. 4.
Witnesses:
Frank L. A. Graham
E. Bechtold
Inventor.
Robert E. Hammer
by his Attorneys
Howson & Howson
THE NORRIS PETERS CO., PHOTO-LITHO., WASHINGTON, D. C.

UNITED STATES PATENT OFFICE.

ROBERT E. HAMMER, OF PHILADELPHIA, PENNSYLVANIA.

BACK-PEDALING BRAKE.

SPECIFICATION forming part of Letters Patent No. 600,783, dated March 15, 1898.

Application filed June 11, 1897. Serial No. 640,310. (No model.)

*To all whom it may concern:*

Be it known that I, ROBERT E. HAMMER, a citizen of the United States, residing in Philadelphia, Pennsylvania, have invented certain Improvements in Brakes for Vehicles, of which the following is a specification.

My invention relates to that class of brakes for vehicles in which the brake is applied by the backward turning of the device whereby power is applied to the wheel, one object of my invention being to so construct such a brake that the operating parts of the same will be protected from injury and from the access of dirt or grit, a further object being to insure the release of the brake as soon as the backward pressure upon the same is removed, and a still further object being to provide for the attachment of the braking device to the wheel of a bicycle or other vehicle, readily and without any change in the construction of the wheel itself. These objects I attain in the manner hereinafter set forth, reference being had to the accompanying drawings, in which—

Figure 1 is a view, partly in elevation and partly in section, of sufficient of the driving-wheel of a vehicle to illustrate the application of my improved braking mechanism thereto. Fig. 2 is a transverse section of the same, partly in elevation. Fig. 3 is a detached view of one of the elements of the brake, and Fig. 4 is a view illustrating a modification of part of the invention.

In Fig. 1 the hub of the driving-wheel of the vehicle is represented at 1, this hub being mounted by means of ball-bearings upon the fixed axle 2, which is carried by the opposite portions of the frame 3 of the vehicle in any well-known manner. The hub has at one side a threaded projection 4, upon which is screwed a ring 5, having thereon peripheral projections or ribs 6, which are inclined in respect to the axial line of the hub, as shown in Fig. 3, and mounted upon this ring 5 is the hub of the sprocket-wheel 7 or other driving device whereby rotative movement is imparted to the hub 1, said sprocket-wheel hub having internal recesses 8 for the reception of the peripheral ribs 6 of the ring 5, as shown in Figs. 1 and 2. A coiled spring 9 has one end secured to the ring 5 and the other end to the sprocket-wheel 7, as shown in Fig. 2, the tendency of this spring being to move said wheel 7 constantly forward, or in the direction of the arrow, Fig. 2, which movement tends to draw the wheel inwardly on the ring 5 to the full extent, as shown in Fig. 1.

Secured to or forming part of the wheel 7 are two flanges 10 and 11, the flange 10 being a brake-flange, which acts in conjunction with a braking-surface 12, of leather, vulcanized fiber, wood, or other suitable material, secured upon the inner side of a disk 13, which is secured to the shaft or axle 2 in any available manner so as to be incapable of rotation thereupon. The whole braking device can thus be readily applied to the driving-wheel of a bicycle, which is usually provided with a threaded extension at one side of the hub.

Normally the wheel 7 and its disk 10 occupy the position shown in Fig. 1, being held in this position both by the power of the driving device acting to turn forward the wheel 7, ring 5, and hub 1 of the wheel and by the action of the coiled spring 9. Hence the inclined ribs 6 serve to draw the wheel 7 inward, and the brake-flange 10 is normally held free from contact with the braking-surface 12 of the disk 13. When, however, it is desired to apply the brake, the wheel 7 is turned backward slightly, so that the action of the ribs 6 of the ring 5 throws the wheel 7 and its braking-flange 10 outwardly and brings said flange into contact with the braking-surface 12 with a force dependent upon the force of the backward movement exerted upon the wheel 7. Hence the brake can be applied with any desired degree of power by varying the force of such backward movement. As soon as this force is removed, however, the spring 9 again throws the wheel 7 forwardly, thus causing at the same time its inward movement and instantly withdrawing the flange 10 from contact with the braking-surface 12.

The disk 13 has a peripheral flange 14, which overlaps the flange 11 on the wheel 7 and serves to inclose and protect the braking mechanism, the flange being continuous, with the exception of openings 15 formed therein for the passage of the sprocket-chain when such chain is employed as a means of transmitting power to the rear wheel.

The ribs 6 of the ring 5 are protected by the wheel 7, so that the access of dirt thereto is precluded and jamming of the brake or any interference with the proper application of the same is thus prevented.

Instead of employing ribs upon the ring 5, adapted to recesses in the wheel 7, I may in some cases form recesses in both the ring and wheel for the reception of balls 16, as shown in Fig. 4, thereby further lessening the slight friction due to the movement of the wheel 7 in applying or removing the brake. The balls 16 thus serve the same purpose as ribs on one part, engaging with grooves in the other part to effect lateral movement simultaneously with forward or backward movement.

It is evident that my improved brake may be used in other relations than in connection with the driving-wheel 7, any appropriate means being employed for imparting a backward movement to the disk 10, whereby its outward movement on the ring 5 is effected.

I am aware that a braking device having side cams, whereby the brake is applied on the backward movement of a drive-wheel and released on the forward movement, has heretofore been devised, and I do not claim that construction, except in such of my claims as contain other elements of novelty, some of my claims being distinguished from such prior construction by reference to the location of the inclined ribs on the periphery of the ring 5, where they are covered and protected by the hub of the wheel 7.

Having thus described my invention, I claim and desire to secure by Letters Patent—

1. The combination in a braking device for vehicles, of a fixed disk having a braking-surface thereon, a wheel-hub having a ring with peripheral ribs inclined in respect to the axis of the hub, a drive-wheel having recesses for the reception of said ribs, a braking-flange secured to said wheel and flanges formed upon the drive-wheel and fixed brake-disk and serving to inclose the driving and braking mechanism, substantially as specified.

2. The combination in a braking device for vehicles, of a wheel-hub having a threaded projection at one side, a ring screwed upon said projection, a driving-wheel having a hub mounted upon said ring, engaging ribs and recesses on the periphery of the ring and bore of the hub, inclined in respect to the axial line of the hub, a braking-flange on said driving-wheel, and a fixed disk having a braking-surface thereon, substantially as specified.

In testimony whereof I have signed my name to this specification in the presence of two subscribing witnesses.

ROBERT E. HAMMER.

Witnesses:
   CHAS. H. BANNARD,
   WILL. A. BARR.